United States Patent
Chu et al.

(10) Patent No.: US 8,351,865 B2
(45) Date of Patent: Jan. 8, 2013

(54) TRANSMIT POWER CONTROL IN 160 MHZ BSS

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 77 days.

(21) Appl. No.: 12/970,797

(22) Filed: Dec. 16, 2010

(65) Prior Publication Data

US 2012/0157151 A1    Jun. 21, 2012

(51) Int. Cl.
*H04B 1/00* (2006.01)
*H04K 3/00* (2006.01)

(52) U.S. Cl. .......................................... 455/69; 455/522

(58) Field of Classification Search .................. 455/69, 455/522; 370/338
See application file for complete search history.

(56) References Cited

U.S. PATENT DOCUMENTS

| | | | |
|---|---|---|---|
| 2005/0135318 A1* | 6/2005 | Walton et al. | 370/338 |
| 2005/0143115 A1* | 6/2005 | Hiddink et al. | 455/522 |
| 2011/0116401 A1* | 5/2011 | Banerjea et al. | 370/252 |

* cited by examiner

*Primary Examiner* — Lee Nguyen
(74) *Attorney, Agent, or Firm* — Hogan Lovells US LLP (57) ABSTRACT

Three alternative methods of controlling transmit power in a basic service set (BSS) including a plurality of stations that have successfully synchronized with an access point include providing each BSS with one transmit power limit that is not more than the lowest one of the transmit power limits of all of its operating channels, providing each BSS with one transmit power limit that is fixed for physical layer convergence procedure (PLCP) protocol data units (PPDU) with each channel bandwidth, or providing each BSS with one transmit power limit that is fixed for each 80 MHz channel.

21 Claims, 8 Drawing Sheets

| ELEMENT ID | LENGTH | PRIMARY (80MHz) CHANNEL LOCAL POWER CONSTRAINT | SECONDARY (80MHz) CHANNEL LOCAL POWER CONSTRAINT |

Fig. 10

| ELEMENT ID | LENGTH | PRIMARY (80MHz) CHANNEL MINIMUM TRANSMIT POWER CAPACITY | PRIMARY (80MHz) CHANNEL MAXIMUM TRANSMIT POWER CAPACITY | SECONDARY (80MHz) CHANNEL MINIMUM TRANSMIT POWER CAPACITY | SECONDARY (80MHz) CHANNEL MAXIMUM TRANSMIT POWER CAPACITY |

Fig. 11

| ELEMENT ID | LENGTH | PRIMARY (80MHz) CHANNEL TRANSMIT POWER | PRIMARY (80MHz) CHANNEL LINK MARGIN | SECONDARY (80MHz) CHANNEL TRANSMIT POWER | SECONDARY (80MHz) CHANNEL LINK MARGIN |

Fig. 12

Fig. 13

TRANSMIT POWER CONTROL IN 160 MHZ BSS

BACKGROUND OF THE INVENTION

The present invention relates to wireless systems and more particularly to the transmitting power limits associated with such wireless systems.

Figure 1:
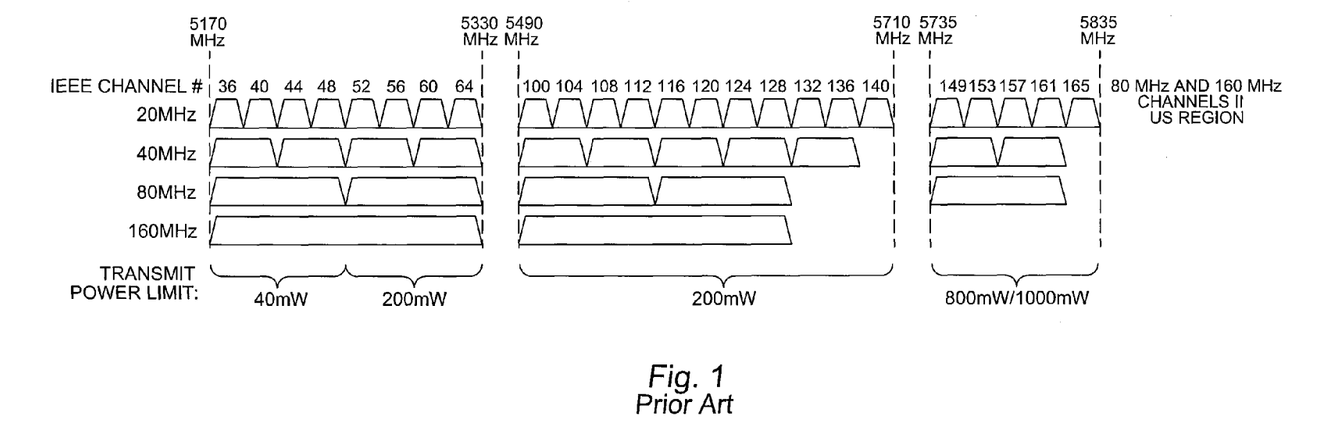
FIG. 1 is a depiction of the transmit power limits in 20 MHz, 40 MHz, 80 Mhz, and 160 MHz channels in the US region according to the prior art.

Referring to FIG. 1, the power limits associated with 20 MHz, 40 MHz, 80 MHz, and 160 MHz channels in the US operating region are shown. Certain observations of the transmitting power limits can be made. Each 40 MHz channel has the same transmit power limit. Each 80 MHz channel has the same transmit power limit. A 160 MHz channel that is comprised of two adjacent 80 MHz channels may have a different regulatory transmit power limit. A 160 MHz channel that is comprised of two non-adjacent 80 MHz channels may also have different regulatory transmit power limits. It is not clear what the rules are regarding transmit power limits in a 160 MHz Basic Services Set (BSS) with different regulatory transmit power limits in different channels.

Therefore, what is desired is at least one clear set of rules for transmit power limits in a 160 MHz BSS.

SUMMARY OF THE INVENTION

According to the present invention, a first method of controlling transmit power in a basic service set (BSS) including a plurality of stations that have successfully synchronized with an access point comprises providing each BSS with one transmit power limit that is not more than the lowest one of the transmit power limits of all of its operating channels. If a 160 MHz BSS has low throughput because of a high power 80 MHz transmission from an overlapping BSS, the 160 MHz BSS switches to an 80 MHz BSS using an original primary 80 MHz channel or a secondary 80 MHz channel if the BSS still desires to be in the current operating channel. If a 160 MHz BSS has low throughput because of a high power 80 MHz transmission from an overlapping BSS, the 160 MHz BSS can also move to another channel.

According to the present invention, a second method of controlling transmit power in a basic service set (BSS) including a plurality of stations that have successfully synchronized with an access point comprises providing each BSS with one transmit power limit that is fixed for physical layer convergence procedure (PLCP) protocol data units (PPDU) with each channel bandwidth. Each BSS is allowed to have a different transmit power limit for different operating channels, but in a given PPDU, the same transmit power limit is used. In the second method, an extended transmit power control signal is transmitted by a station. The extended transmit power control signal comprises a primary channel local power constraint and a secondary channel local power constraint. A station uses a transmit power that is lower than a primary channel local power constraint when transmitting at a first PPDU. The first PPDU comprises a 20 MHz, 40 MHz, or 80 MHz PPDU. A station shall use a transmit power that is lower than the primary channel local power constraint and the secondary channel local power constraint when transmitting at a second PPDU. The second PPDU comprises a 160 MHz PPDU. The extended power control signal comprises a primary channel minimum transmit power capacity, a primary channel maximum transmit power capacity, a secondary channel minimum transmit power capacity, and a secondary channel maximum transmit power capacity. A station provides the access point with its extended power capability for a current channel when associating or reassociating. The access point uses the extended power capability to decide if the association/reassociation request should be accepted, and to determine the extended power constraint.

According to the present invention, a third method of controlling transmit power in a basic service set (BSS) including a plurality of stations that have successfully synchronized with an access point comprises providing each BSS with one transmit power limit that is fixed for each 80 MHz channel. Each BSS can have a different transmit power limit in different operating channels in a PPDU. In the third method, an extended transmit power control signal is transmitted by each station. The extended transmit power control signal comprises a primary channel local power constraint field and a secondary channel local power constraint field. A station uses a transmit power in a primary channel that is lower than the primary channel local power constraint in a primary channel when the transmitted PPDU is in a primary and secondary channel. A station uses a transmit power in a secondary channel that is lower than the secondary channel local power constraint in a secondary channel when the transmitted PPDU is in a primary and secondary channel. A station shall provide the access point with its extended power capability for the current channel when associating or reassociating. The extended power control signal comprises a primary channel minimum transmit power capacity, a primary channel maximum transmit power capacity, a secondary channel minimum transmit power capacity, and a secondary channel maximum transmit power capacity. The transmit power control report comprises a primary channel transmit power limit, a primary channel link margin, a secondary channel transmit power limit, and a secondary channel link margin.

BRIEF DESCRIPTION OF THE DRAWINGS

Other objects and advantages of the present invention will become apparent from the following description of the preferred embodiment with reference to the drawings, in which.

DETAILED DESCRIPTION

Figure 2:
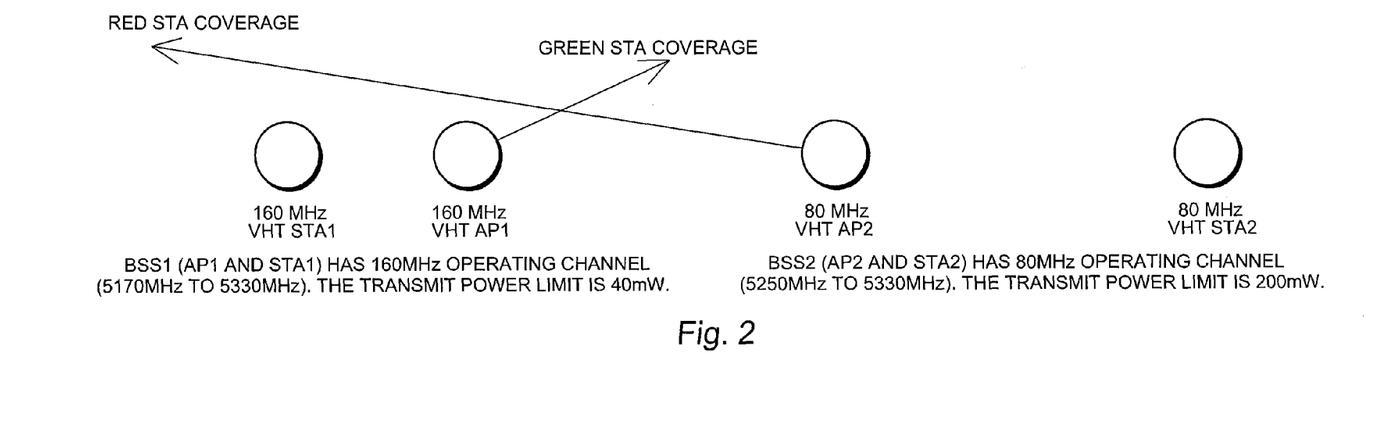
FIG. 2 shows the regulatory transmit power limit in each channel as context for the first method of the invention.

Referring generally to FIG. 2, a first method of the present invention includes a unified transmit power limit per BSS.

Each BSS has one transmit power limit that is not more than the lowest one of the transmit power limits of all of its operating channels. For example, in a BSS with operating channels of 5170 MHz to 5330 MHz, with 5250 MHz to 5270 MHz as the primary channel, the transmit power limit of the BSS is 40 mW. The first method of the present invention is therefore simple, would work with the current 802.11 access methods, and no new transmit power control signal is required. The first method according to the present invention is a solution compatible with the 802.11 baseline standard. However, the scope of the BSS may be too small in some cases. An 80 MHz neighbor BSS may always have high priority to access the medium since a 160 MHz BSS can detect 80 MHz transmission but an 80 MHz BSS cannot detect 160 MHz transmission. A 160 MHz BSS may have lower throughput.

If a 160 MHz BSS has low throughput because of a (high power) 80 MHz transmission from overlapping BSS, then the 160 MHz BSS should switch to a 80 MHz BSS using the original primary 80 MHz channel or secondary 80 MHz channel if the BSS still desires to be part of the current operating channel. Otherwise, the 160 MHz BSS can also select to move to another channel.

Figure 3:
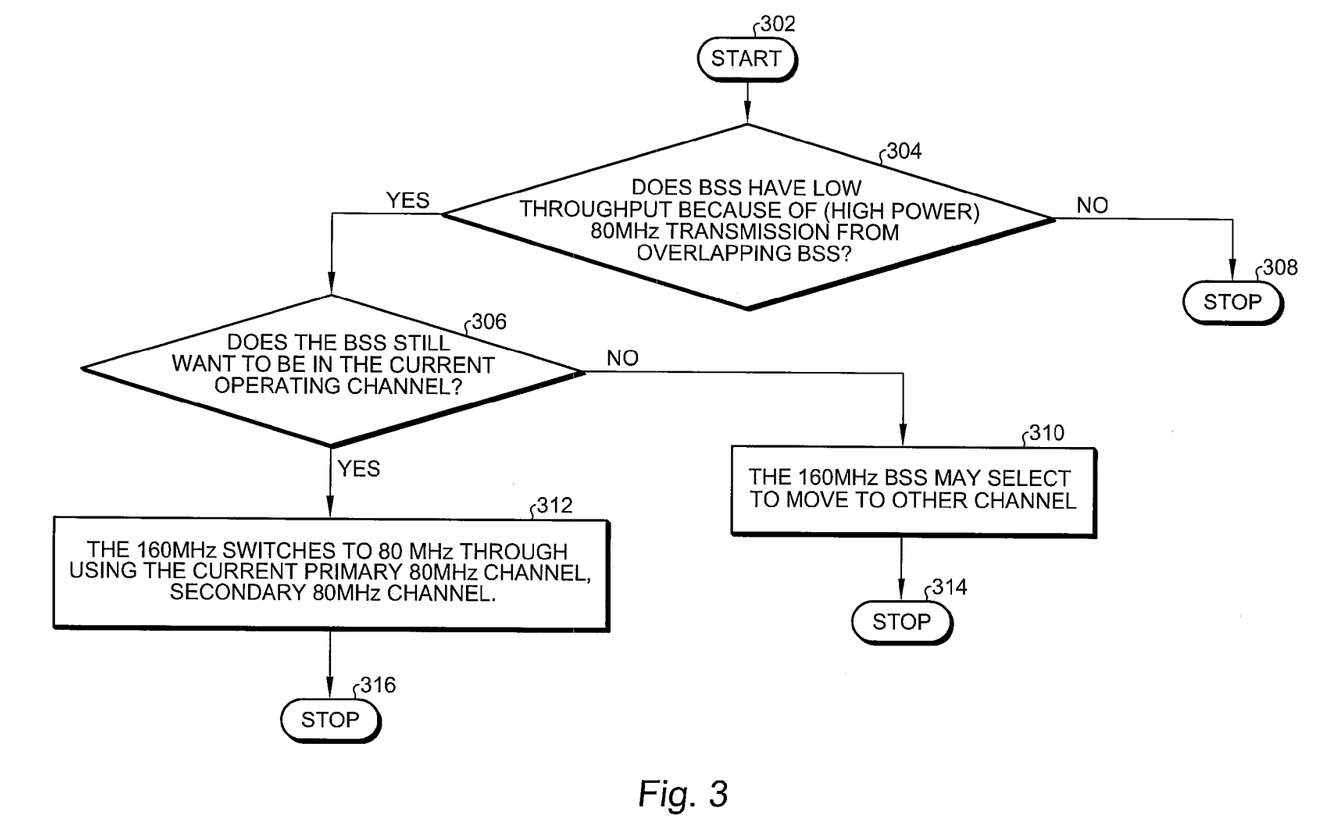
FIG. 3 is a flow chart corresponding to a first method of the present invention.

Referring now to FIG. 3, a flow chart of the first method of the present invention is shown for channel switching of a 160 MHz BSS. The method starts at block 302. At 304, the method asks if the BSS has low throughput because of (high power) 80 MHz transmission from an overlapping BSS. If no, the method is not required any further and stops at 308. If yes, the method continues at 306 and asks if the BSS still desires to be in the current operating channel. If no, the 160 MHz BSS may select to move to another channel at 310, and then the method stops at 314. If yes, the method continues at 312, and the 160 MHz BSS switches to an 80 MHz BSS through using the current primary 80 MHz channel or secondary 80 MHz channel. The method then stops at 316.

Figure 4:
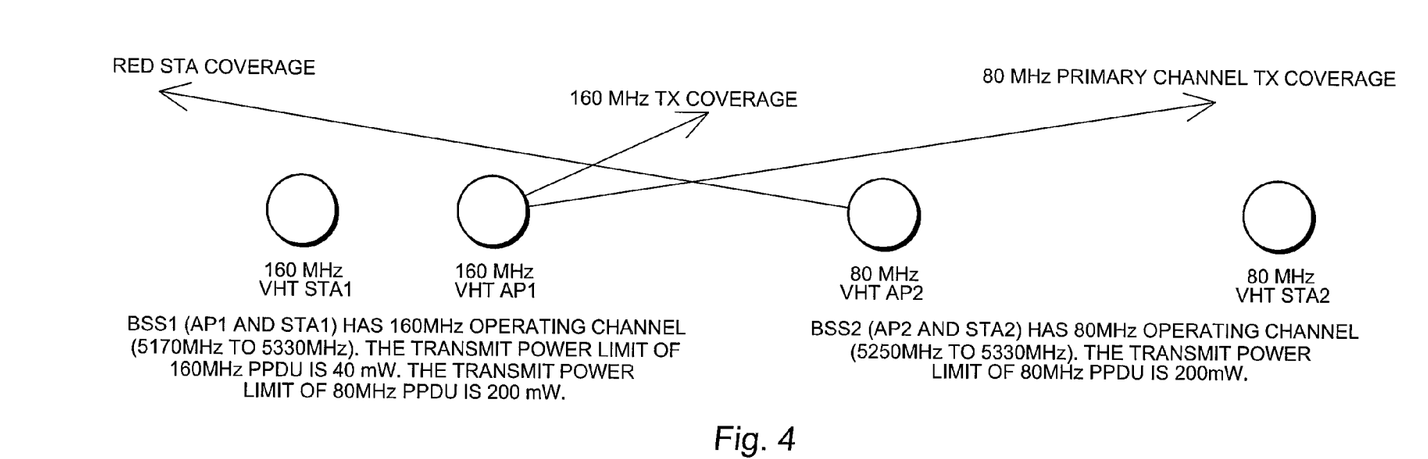
FIG. 4 shows the regulatory transmit power limit in each channel as context for the second method of the invention.

Referring generally to FIG. 4, a second method of the present invention includes a transmit power limit per PPDU bandwidth. A BSS can have a different transmit power limit in different operating channels. But in one PPDU, the same transmit power is used. For example, in a BSS with an operating channel of 5170 MHz to 5330 MHz, with 5250 MHz to 5270 MHz as the primary channel, the transmit power limit of 80 MHz PPDU in channel 5250 MHz to 5330 MHz is 200 mW. The transmit power limit of 160 MHz PPDU in the channel of 5170 MHz to 5330 MHz is 40 mW. In the second method of the present invention, the BSS can cover a wider scope if required. The scope of the 160 MHz Transmission Opportunity (TXOP) transmission, however, may be too small in some cases. An 80 MHz neighbor BSS may always have high priority to access the medium since a 160 MHz BSS can detect 80 MHz transmission but an 80 MHz BSS cannot detect a 160 MHz transmission. Medium Access Control (MAC) rules can be invented to avoid such problems through protecting a 160 MHz TXOP by the 80 MHz PPDU.

Figures 5, 6:
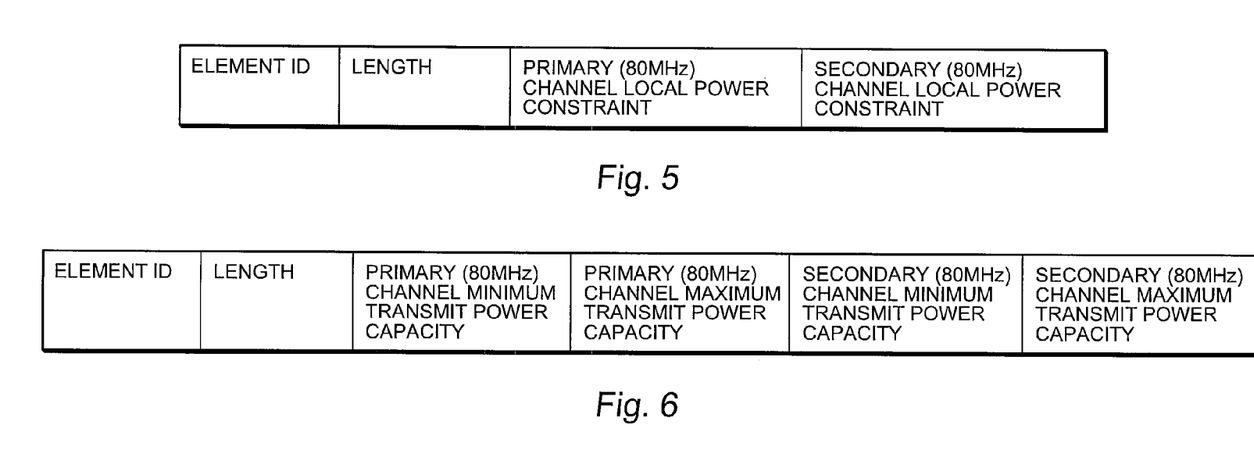
FIG. 5 is an information element according to a second method of the present invention.
FIG. 6 is an information element according to a second method of the present invention.

In the second method of the invention, the transmit power control signal is changed. Referring generally to FIG. 5, a first information element is shown and described below. As is known in the art, in the 802.11 standard, an information element is a variable length element that is part of the management frame. It is transmitted by STAs/AP in a BSS. In the second method of the present invention, an extended transmit power control signal includes an element ID field, a length field, a primary (80 MHz) channel local power constraint field and a secondary (80 MHz) channel local power constraint field. The power constraint fields indicate the local power constraints of the primary (80 MHz) channel and the secondary (80 MHz) channel. If the operating channel is other than the 160 MHz channel, the fields related with secondary (80 MHz) channel are not required.

A STA shall use the transmit power that is lower than primary (80 MHz) channel local power constraint when transmitting a 20 MHz/40 MHz/80 MHz PPDU. A STA shall use the transmit power that is lower than the primary (80 MHz) channel local power constraint and secondary (80 MHz) channel local power constraint when transmitting a 160 MHz PPDU.

Referring now to FIG. 6, further details of the extended transmit power control signal are described with reference to a second information element. In FIG. 6, the relevant fields are element ID, length, primary (80 MHz) channel minimum transmit power capacity, primary (80 MHz) channel maximum transmit power capacity, secondary (80 MHz) channel minimum transmit power capacity, and secondary (80 MHz) channel maximum transmit power capacity. If the operating channel is other than the 160 MHz channel, the fields related with the secondary (80 MHz) channel are not required. A STA shall provide an AP with its extended power capability for the current channel when associating or reassociating. (An AP uses an association procedure to decide if a STA can join the BSS and once a STA is accepted by an AP, the STA synchronizes with the AP of a BASS, which includes timing, allowed transmit power, allowed transmit rate, as well as other factors.) An AP may use the extended power capability to decide if the association/reassociation request should be accepted, and determine the extended power constraint.

Figure 7:
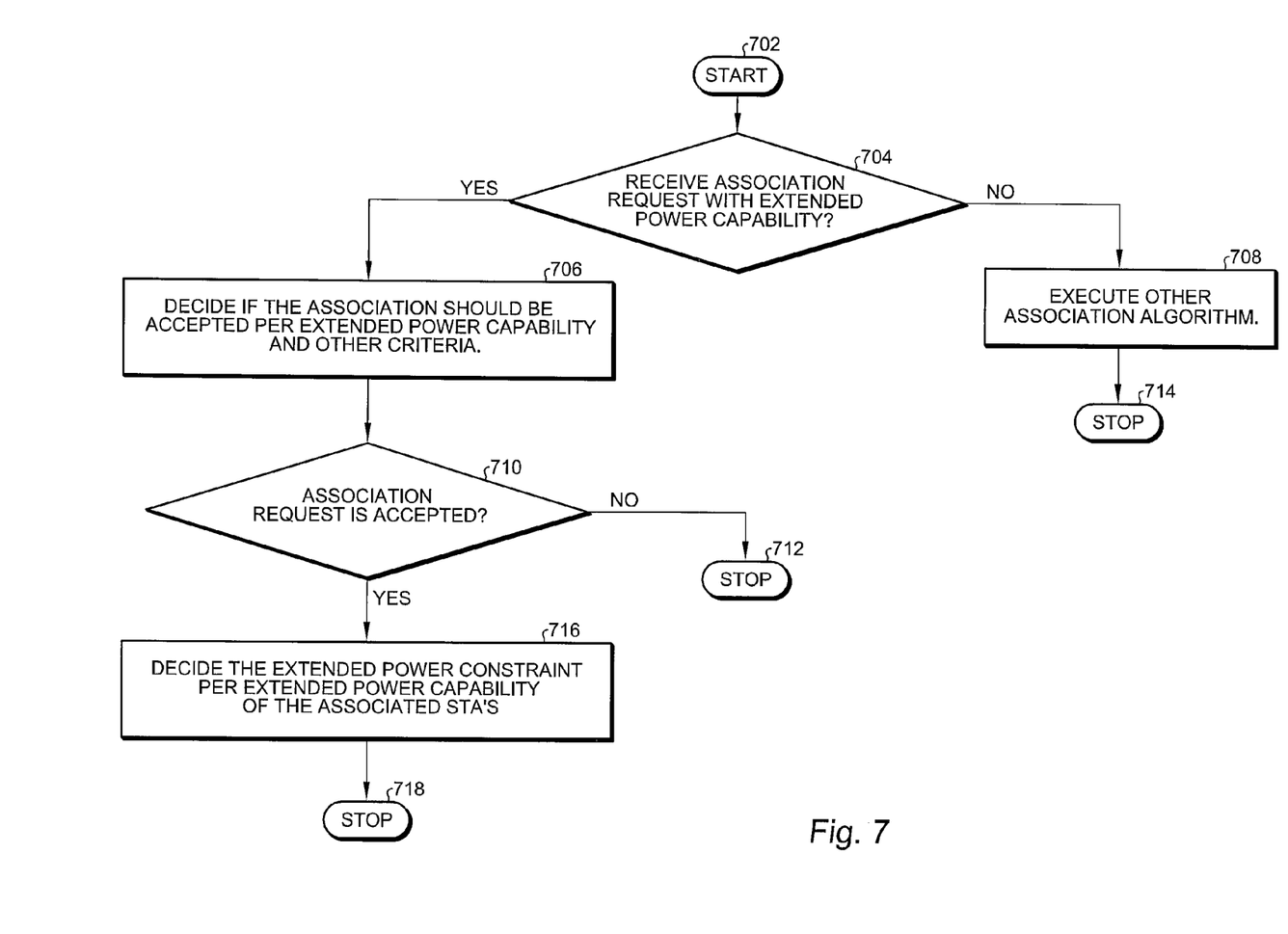
FIG. 7 is a first flow chart associated with the second method of the present invention.

According to the second method of the present invention, a flow chart is shown in FIG. 7 related to association and the local power constraint decision. When an AP receives a reassociation request, the same algorithm as shown in FIG. 7 can also be executed. The method starts at 702. At 704, the method asks if an association request with extended power capability has been received. If no, a different association algorithm 708 is executed, and the method is stopped at 714. If yes, the method decides if the association should be accepted per the extended power capability and other criteria at 706, and the association requested is accepted or not at 710. If no, then the method stops at 712. If yes, then the method decides the extended power constraint per extended power capability of the associated STAs at 716. The method then stops at 718.

According to the second method of the present invention, the following rules of transmit power limit per PPDU pertain. A Very High Throughput (VHT) STA should give the highest priority to the channel with the channel high-power limit when selecting the primary channel. A high power 80 MHz PPDU may be used to protect the following 160 MHz transmission.

The rules for 160 MHz TXOP with 80 MHz Request to Send/Clear to Send (RTS/CTS) protection includes, when a RTS/CTS is used to start a TXOP in the 160 MHz channel, the following first data frame should be an 80 MHz frame and have the same cover scope in the 80 MHz primary channel.

The rules for the Control Frame to truncate the TXOP (CF-End) includes, at the end of a 160 MHz TXOP that is protected by a higher power 80 MHz PPDU, a 80 MHz CF-End should be used to release the TXOP.

Figure 8:
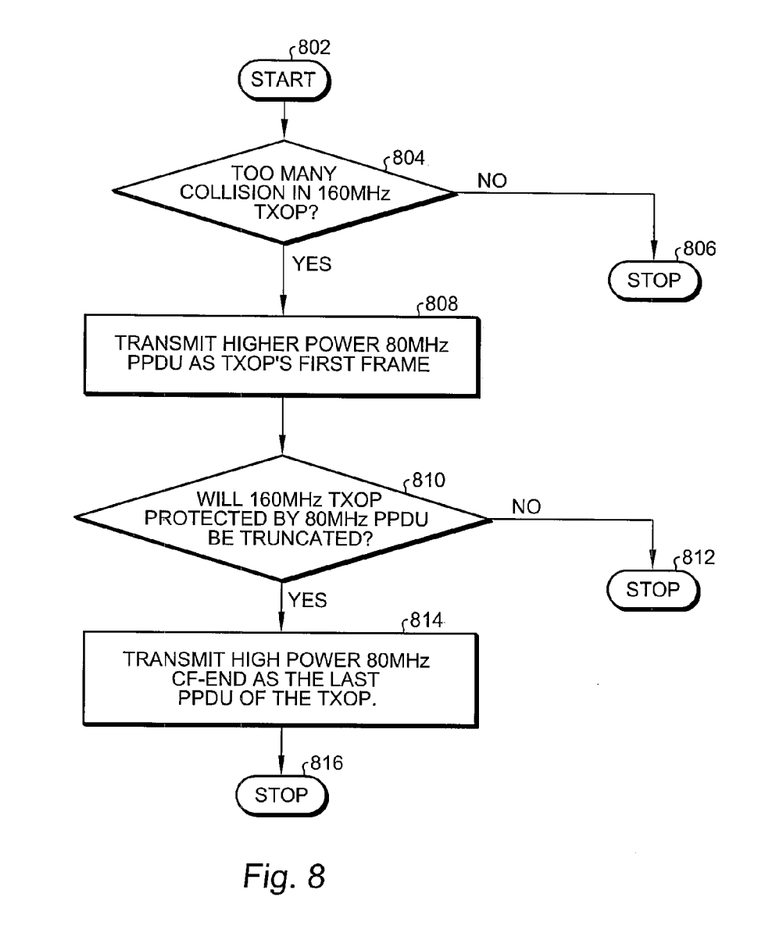
FIG. 8 is a second flow chart associated with the second method of the present invention.

Referring now to FIG. 8, a flow chart for 160 MHz TXOP protection and truncation is shown according to the second method of the present invention. The method starts at 802. At 804, the method asks whether or not there have been too many collisions in the 160 MHz TXOP. If not, the method stops at 806. If yes, the method continues at 808 and transmits a high power 80 MHZ PPDU as the TXOP's first frame. At 810, the method asks if the 160 MHz TXOP protected by the 80 MHz PPDU be truncated. If no, the method stops at 812. If yes, then the method transmits a high power 80 MHz CF-End as the last PPDU of the TXOP 814, and the method ends at 816.

Figure 9:
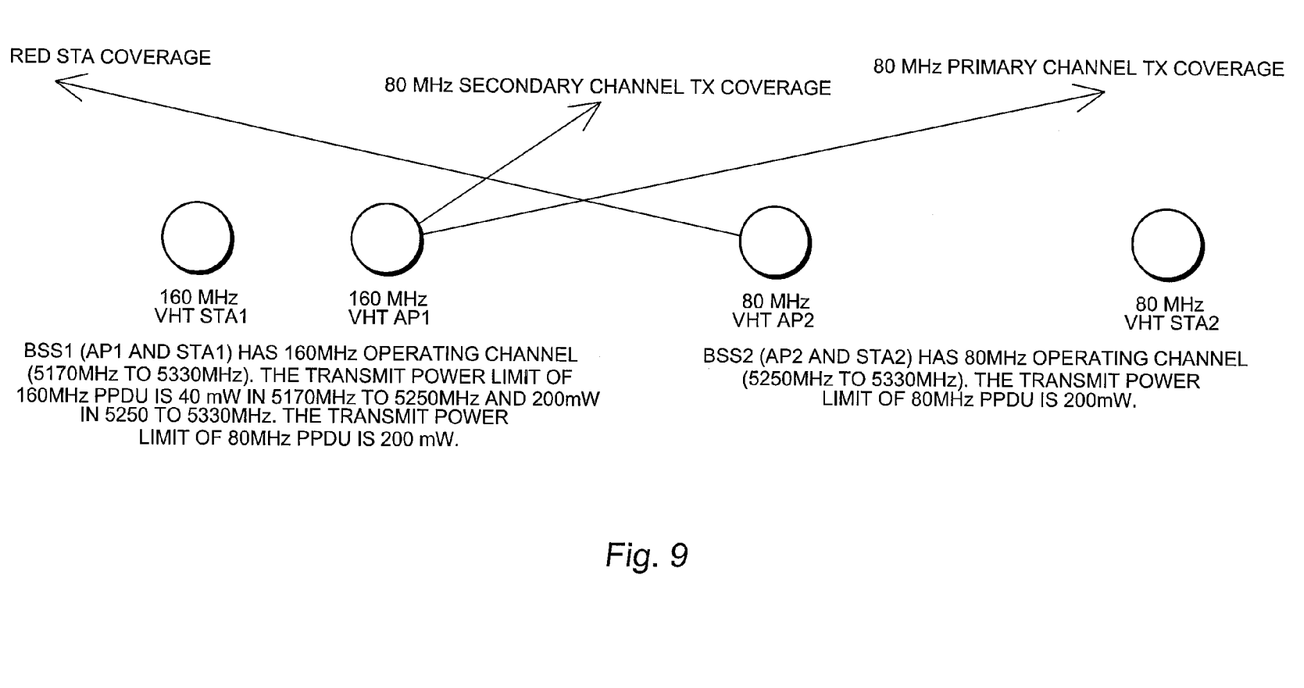
FIG. 9 shows the regulatory transmit power level in each channel as context for a third method of the invention.

Referring generally to FIG. 9, a third method of the invention uses a transmit power limit per 80 MHz channel. A BSS can have a different transmit power limit in different operating channels in a PPDU. For example, in a BSS with an operating channel of 5170 MHz to 5330 MHz, with 5250 MHz to 5270 MHz as the primary channel, if a STA transmits a 160 MHz PPDU, the transmit power limit in channel 5250 MHz to 5330 MHz is 200 mW. The transmit power limit in channel 5170 to 5250 is 40 mW. If a STA transmits a 80 MHz PPDU, the transmit power limit is 200 mW. The BSS can cover a wider scope if required. Some rules are required to harmonize these kinds of BSSs with the correct medium access.

In the third method of the invention, the transmit power control signal should be changed.

Figure 10:
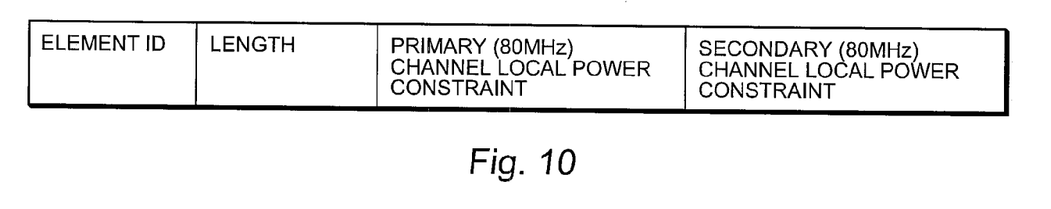
FIG. 10 is an information element according to a third method of the present invention.

Referring now to FIG. 10 an extended transmit power control signal is described with reference to a first information element. The fields of the first information element include an element ID, length, a primary (80 MHz) channel local power constraint and secondary (80 MHz) channel local power constraint. These fields indicate the local power constraints of the primary (80 MHz) channel and the secondary (80 MHz) channel. If the operating channel is other than the 160 MHz channel, the fields related with secondary (80 MHz) channel are not required. A STA shall use the transmit power that is lower than primary (80 MHz) channel local power constraint when transmitting 20 MHz/40 MHz/80 MHz PPDU.

A STA shall use the transmit power that is lower than primary (80 MHz) channel local power constraint in the primary 80 MHz channel and the secondary (80 MHz) channel local power constraint in the secondary 80 MHz channel when transmitting 160 MHz PPDU.

Figure 11:
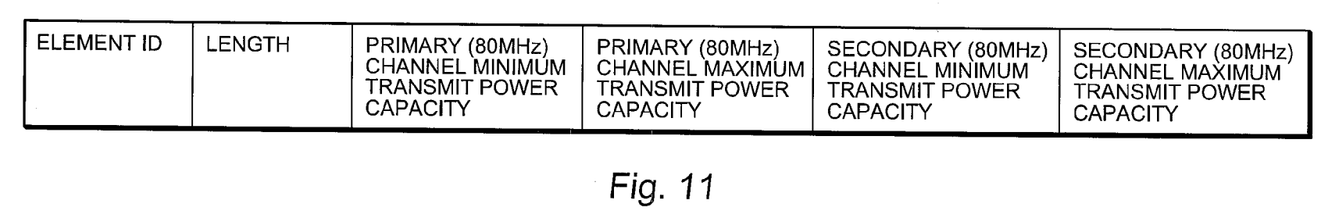
FIG. 11 is an information element according to the third method of the present invention.

Referring now to FIG. 11, the extended transmit power control signal is described with reference to a second information element. The fields of the second information element include an element ID, length, primary (80 MHz) channel minimum transmit power capacity, primary (80 MHz) channel maximum transmit power capacity, secondary (80 MHz) channel minimum transmit power capacity, and secondary (80 MHz) channel maximum transmit power capacity. If the operating channel is other than 160 MHz channel, the fields related with secondary (80 MHz) channel are not required. A STA shall provide an AP with its extended power capability for the current channel when associating or reassociating. An AP may use the extended power capability to decide if the association/reassociation request should be accepted, and determine the extended power constraint.

Figure 12:
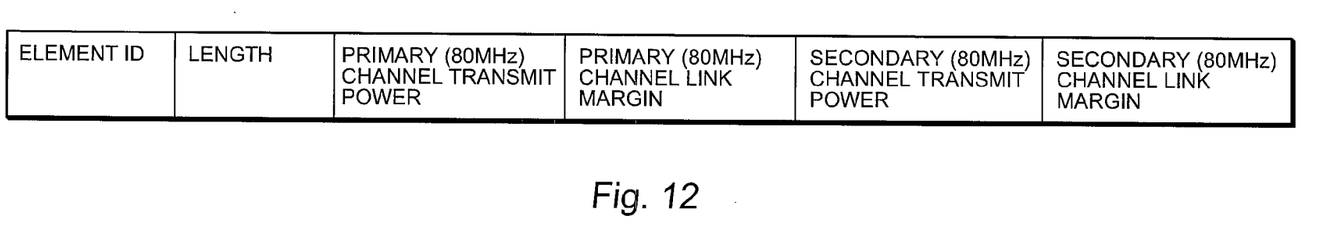
FIG. 12 is an information element according to the third method of the present invention.

Referring now to FIG. 12, the extended power control signal is described with reference to a third information element. The fields of the third information element include an element ID, length, the transmit power and link margin of the primary (80 MHz) channel, and the transmit power and link margin of the secondary (80 MHz) channel. If the operating channel is other than 160 MHz channel, the fields related with secondary (80 MHz) channel are not required. A TXVECTOR will include a TXPWR_LEVEL for the primary (80 MHz) channel and secondary (80 MHz) channel. If the operating channel is other than 160 MHz channel, the fields related with secondary (80 MHz) channel are not required.

Figure 13:
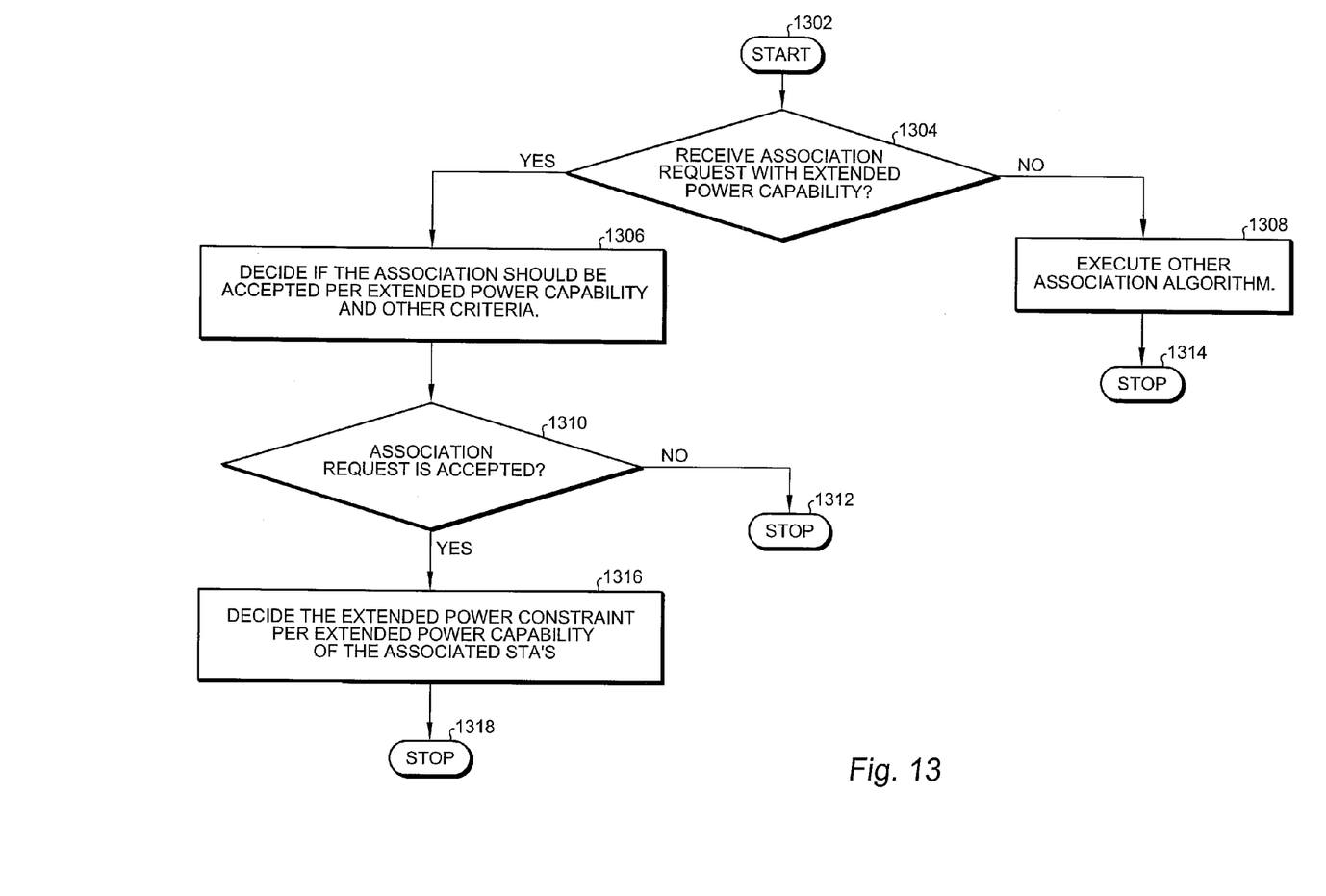
FIG. 13 is a flow chart associated with the third method of the present invention.

Referring now to FIG. 13, a flow chart according to the third method of the invention is shown related to association and a local power constraint decision. When an AP receives a reassociation request, the same algorithm shown in FIG. 13 may be executed. The method starts at 1302. At 1304, the method asks an association request with extended power capability has been received. If no, another association algorithm is executed at 1308, and the method ends at 1314. If yes, the method decides if the association should be accepted per the extended power capability and other criteria at 1306. The method then asks if the association request is accepted at 1310. If no, then the method ends at 1312. If yes, the method decides the extended power constraint per the extended power capability of the associated STAs at 1316. The method then ends at 1318.

The following rules for transmit power limit per 80 MHz channel according to the third method of the invention pertain. A VHT STA should give the high priority to the channel with the channel high-power limit when selecting the primary channel. An 80 MHz PPDU is not required to protect the following 160 MHz transmission.

The rule for the first frame (RTS/CTS-to-Self/Data frame) is that the first frame of the TXOP should cover the whole TXOP in the primary channel to guarantee fairness when overlapping BSS exists.

The rules for TXOP with RTS/CTS protection is that when RTS/CTS are used to start a TXOP in 160 MHz channel, the following first data frame should have the same cover scope in each 80 MHz channel.

The rule for CF-End is that the CF-End should have the same cover scope as the first frame of the TXOP.

In summary three possible transmission power control methods have been described. A first method comprises a unified transmit power limit per BSS. This method is per the 802.11 baseline specification. In many applications, the first method is too restrictive of transmission power. A 160 MHz BSS may have a lower throughput. If a 160 MHz BSS has low throughput because of (high power) 80 MHz transmission from overlapping BSS, the BSS should use a different operating channel. A second method comprises a transmit power limit per PPDU. A high power 80 MHz PPDU may be used to protect a 160 MHz PPDU. No special PHY requirement is required. A new transmit power control signal is required. A third method comprises a transmit power limit per 80 MHz channel. A new PHY requirement is added. A different transmit power is used in different channels in a PPDU. An 80 MHz PPDU is not required to protect the following 160 MHz transmission. A new transmit power control signal is required.

GLOSSARY

AP: access point—an entity that contains one station (STA) and provides access to the distribution services, via the wireless medium (WM) for associated STAs BSS: basic service set—a set of stations (STAs) and an AP (access point) that the STAs have successfully synchronized with the AP. Membership in a BSS does not imply that wireless communication with all other members of the BSS is possible.

CTS: clear to send

PPDU: physical layer convergence procedure (PLCP) protocol data unit

RTS: request to send

STA: station—a logical entity that is a singly addressable instance of a medium access control (MAC) and physical layer (PHY) interface to the wireless medium (WM).

TXOP: transmission opportunities—an interval of time when a particular quality of service (QoS) station (STA) has the right to initiate frame exchange sequences onto the wireless medium (WM). A TXOP is defined by a starting time and a maximum duration. The TXOP is either obtained by the STA by successfully contending for the channel or assigned by the hybrid coordinator (HC).

TXPWR_LEVEL: TXPWR_LEVEL selects which of the optional transmit power levels should be used for the current packet transmission.

TXVECTOR: The TXVECTOR represents a list of parameters that the MAC sublayer provides to the local PHY entity in order to transmit a physical layer convergence procedure (PLCP) service data unit (PSDU).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A method of controlling transmit power in a basic service set (BSS), the BSS including a plurality of stations that have successfully synchronized with an access point, comprising operating the BSS with one transmit power level that is not more than a lowest one of the transmit power limits of all of its operating channels and using a channel decision method when transmitting on a 160 MHz channel for resolving low throughput due to a high power 80 MHz transmission from an overlapping BSS.

2. The method of claim 1 wherein if the BSS, while operating on the 160 MHz channel, has low throughput because of the high power 80 MHz transmission from the overlapping BSS, and if the channel decision method chooses to transmit within the 160 MHz channel, the BSS switches to using an original primary 80 MHz channel or a secondary 80 MHz channel of the 160 MHz channel.

3. The method of claim 1 wherein if the BSS, while operating on the 160 MHz channel, has low throughput because of the high power 80 MHz transmission from the overlapping BSS, and if the channel decision method chooses to transmit within the 160 MHz channel, the BSS moves to another channel.

4. A method of controlling transmit power in a basic service set (BSS), the BSS including a plurality of stations that have successfully synchronized with an access point, comprising operating each BSS with one transmit power limit that is fixed for physical layer convergence procedure (PLCP) protocol data units (PPDU) with each channel bandwidth and transmitting power control information within the BSS by using an extended power control signal.

5. The method of claim 4 wherein each BSS is allowed to have a different transmit power limit for different operating channels, but in a given PPDU, the same transmit power limit is used.

6. The method of claim 4 wherein the extended power control signal comprises a primary channel local power constraint and a secondary channel local power constraint.

7. The method of claim 6 wherein a station in the BSS uses a transmit power level that is lower than the primary channel local power constraint when transmitting at a first PPDU.

8. The method of claim 7 wherein the first PPDU comprises a 20 MHz, 40 MHz, or 80 MHz PPDU.

9. The method of claim 7 wherein the station transmits with a transmit power that is lower than the primary channel local power constraint and the secondary channel local power constraint when transmitting at a second PPDU.

10. The method of claim 9 wherein the second PPDU comprises a 160 MHz PPDU.

11. The method of claim 4 wherein the extended power control signal comprises a primary channel minimum transmit power capacity, a primary channel maximum transmit power capacity, a secondary channel minimum transmit power capacity, and a secondary channel maximum transmit power capacity.

12. The method of claim 11 wherein a station in the BSS provides the access point with its extended power capability for a current channel when associating or reassociating.

13. The method of claim 12 wherein the access point uses the extended power capability to decide if an association/reassociation request should be accepted, and to determine an extended power constraint.

14. A method of controlling transmit power in a basic service set (BSS), the BSS including a plurality of stations that have successfully synchronized with an access point, comprising operating each BSS with one transmit power limit that is fixed for each 80 MHz channel available for use by the BSS and transmitting power control information within the BSS by using an extended transmit power control signal.

15. The method of claim 14 wherein the BSS can have a different transmit power limit in different operating channels in a PPDU.

16. The method of claim 14 wherein the extended transmit power control signal comprises a primary channel local power constraint and a secondary channel local power constraint.

17. The method of claim 16 wherein a station in the BSS uses a transmit power that is lower than the primary channel local power constraint.

18. The method of claim 16 wherein a station in the BSS uses a transmit power in a primary 80 MHz channel of a 160 MHz channel that is lower than the primary channel local power constraint, and in a secondary 80 MHz channel of the 160 MHz channel uses a transmit power that is lower than the secondary channel local power constraint.

19. The method of claim 14 wherein a station shall provide the access point with its extended power capability for a current channel when associating or reassociating.

20. The method of claim 19 wherein the extended transmit power control signal comprises a primary channel minimum transmit power capacity, a primary channel maximum transmit power capacity, a secondary channel minimum transmit power capacity, and a secondary channel maximum transmit power capacity.

21. The method of claim 14 wherein the extended transmit power control signal comprises a primary channel transmit power limit, a primary channel link margin, a secondary channel transmit power limit, and a secondary channel link margin.

* * * * *